United States Patent
Inai et al.

(10) Patent No.: US 7,132,189 B2
(45) Date of Patent: *Nov. 7, 2006

(54) FUEL CELL STACK WITH BYPASS

(75) Inventors: Shigeru Inai, Tochigi-ken (JP); Masahiko Sato, Utsunomiya (JP); Seiji Sugiura, Utsunomiya (JP); Shuhei Goto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 416 days.

This patent is subject to a terminal disclaimer.

(21) Appl. No.: 10/442,403

(22) Filed: May 21, 2003

(65) Prior Publication Data

US 2003/0219644 A1    Nov. 27, 2003

(30) Foreign Application Priority Data

May 24, 2002 (JP) .............................. 2002-150198

(51) Int. Cl.
*H01M 2/02* (2006.01)

(52) U.S. Cl. ............................. 429/34; 429/38; 429/35; 429/39

(58) Field of Classification Search .................. 429/34, 429/35, 38, 39, 30, 33; 137/814, 815, 835, 137/51; 239/124, 140; 204/269, 275.1
See application file for complete search history.

(56) References Cited

U.S. PATENT DOCUMENTS

| | | | |
|---|---|---|---|
| 2001/0021468 A1* | 9/2001 | Kanai et al. | 429/12 |
| 2002/0058176 A1* | 5/2002 | Wakahoi et al. | 429/34 |
| 2003/0124407 A1* | 7/2003 | Tanaka et al. | 429/34 |
| 2004/0202911 A1* | 10/2004 | Komura et al. | 429/32 |

FOREIGN PATENT DOCUMENTS

| | | | |
|---|---|---|---|
| JP | 11-238519 | * | 8/1999 |
| JP | 2001236975 A | | 8/2001 |

* cited by examiner

*Primary Examiner*—Raymond Alejandro
(74) *Attorney, Agent, or Firm*—Fish & Richardson P.C.

(57) ABSTRACT

A fuel cell stack includes a stacked body, a negative and positive terminal plates stacked on opposite ends of the stacked body, insulators disposed outside the terminal plates, and the end plates disposed outside the end plates. The insulator includes a first insulator plate, a second insulator plate, and a third insulator plate. Bypass passages are formed on the first insulator plate and the third insulator plate for discharging water in an oxygen-containing gas and water in a fuel gas.

9 Claims, 10 Drawing Sheets

FUEL CELL STACK WITH BYPASS

BACKGROUND OF THE INVENTION

1. Field of the Invention

The present invention relates to a fuel cell stack formed by stacking electrolyte electrode assemblies and separators alternately. Each of the electrolyte electrode assemblies includes a pair of electrodes and an electrolyte interposed between the electrodes.

2. Description of the Related Art

In recent years, various types of fuel cells such as a solid polymer electrolyte fuel cell have been developed. The solid polymer electrolyte fuel cell employs a membrane electrode assembly (MEA) which comprises two electrodes (anode and cathode) and an electrolyte membrane interposed between the electrodes. The electrolyte membrane is a polymer ion exchange membrane (proton exchange membrane). Each of the electrodes comprises a catalyst and a porous carbon paper. The membrane electrode assembly is interposed between separators (bipolar plates). The membrane electrode assembly and the separators make up a unit of the fuel cell (unit cell) for generating electricity. A predetermined number of unit cells are connected together to form a fuel cell stack.

In the fuel cell stack, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to produce water.

Typically, the fuel cell stack has reactant gas supply passages for supplying the oxygen-containing gas and the fuel gas (reactant gases) to the anode and the cathode, and reactant gas discharge passages for discharging the oxygen-containing gas and the fuel gas from the anode and the cathode. The reactant gas supply passages include an oxygen-containing gas supply passage and a fuel gas supply passage extending in a stacking direction of the fuel cell stack. The reactant gas discharge passages include an oxygen-containing gas discharge passage and a fuel gas discharge passage extending in the stacking direction.

The water produced in the electrochemical reaction on the power generation surfaces of the electrodes flows into the oxygen-containing gas discharge passage, and the water may be trapped or retained in the oxygen-containing gas discharge passage. Further, water vapor condensed into liquid water may be trapped in the fuel gas discharge passage. Therefore, the oxygen-containing gas discharge passage and the fuel gas discharge passage are likely to be narrowed or closed by the trapped water undesirably. Thus, power generation performance of the fuel cells may be degraded due to the insufficient flows of the oxygen-containing gas and the fuel gas.

In an attempt to address the problem, a fuel cell stack is disclosed in the Japanese Laid-Open patent publication No. 2001-236975. In the fuel cell stack, an oxygen-containing gas supply passage connected to a supply port and an oxygen-containing gas discharge passage connected to a discharge port extends in the stacking direction of the fuel cell stack. A bypass plate is provided at a position remote from the discharge port of the oxygen-containing gas discharge passage. A bypass passage formed on the bypass plate has an inlet port connected to the oxygen-containing gas supply passage at one end, and has an outlet port connected to the oxygen-containing gas discharge passage at the other end.

In the fuel cell stack, some of the oxygen-containing gas supplied to the oxygen-containing gas supply passage flows into the inlet port of the bypass passage, flows out of the outlet port of the bypass passage, and jetted into the oxygen-containing gas discharge passage. The water which is produced in the electrochemical reactions is likely to be trapped in the oxygen-containing gas discharge passage at locations remote from the discharge port. The oxygen-containing gas jetted from the bypass passage pushes the trapped water out of the discharge port of the oxygen-containing gas discharge passage. Thus, the water (condensed water) is discharged from the fuel cell stack smoothly, and the desirable power generation performance of the fuel cell stack is maintained.

When the operation of the fuel cell stack is started, or when the operation of the fuel cell stack is restarted after a temporal interruption, condensed water may be present in the pipes for supplying the reactant gases (oxygen-containing gas and/or fuel gas) to the fuel cell stack.

In particular, the amount of condensed water present in the pipe for supplying the oxygen-containing gas to the fuel cell stack tends to be large, and the condensed water may flow into the fuel cell stack undesirably. If droplets of the condensed water cover power generation surfaces of unit cells near the supply ports of the reactant gases, the power generation performance of the unit cells may be degraded undesirably.

In the fuel cell stack, the unit cells are electrically connected in series. Therefore, the respective unit cells generate the same amount of electricity. If voltage drop occurs in some unit cells, the system is operated to limit the amount of electricity collected from the fuel cell stack for protecting the unit cells. If the voltage drop continues in the unit cells, a reverse current may be generated due to a large current beyond the outputting capability of the unit cells.

SUMMARY OF THE INVENTION

A main object of the present invention is to provide a fuel cell stack having a simple and compact structure, in which a reactant gas having a suitable moisture is supplied to electrolyte electrode assemblies of the fuel cell stack.

According to the present invention, a stacked body of the fuel cell stack is formed by stacking a plurality of electrolyte electrode assemblies and separators. Each of the electrolyte electrode assemblies includes electrodes and an electrolyte interposed between the electrodes. At least one reactant gas supply passage extends through the stacked body in the stacking direction for supplying a reactant gas to the electrolyte electrode assemblies, and at least one reactant gas discharge passage extends through the stacked body for discharging the reactant gas from the electrolyte electrode assemblies. Terminal plates are stacked on opposite ends of said stacked body, insulators are stacked outside said terminal plates, and end plates are stacked outside the insulators.

At least one bypass passage is formed on the insulator or the end plate for connecting the reactant gas supply passage and the reactant gas discharge passage.

Thus, with the simple and compact structure, it is possible to prevent the power generation surfaces from being covered with droplets of the water. It is possible to maintain the desirable power generation performance of the fuel cell stack.

Further, According to the present invention, at least one reactant gas supply pipe and at least one reactant gas discharge pipe are provided outside the end plate for supplying the reactant gas from the reactant gas supply pipe to the reactant gas supply passage and discharging the reactant gas from the reactant gas discharge passage to the reactant gas discharge pipe. The reactant gas supply pipe and the reactant gas discharge pipe are connected by a bypass pipe. Before the reactant gas is supplied to the reactant gas supply passage, the water in the reactant gas is discharged into the reactant gas discharge passage through the bypass pipe.

Thus, no excessive water is supplied into the fuel cell stack. With the simple and compact structure, the power generation performance of the fuel cell stack is greatly improved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
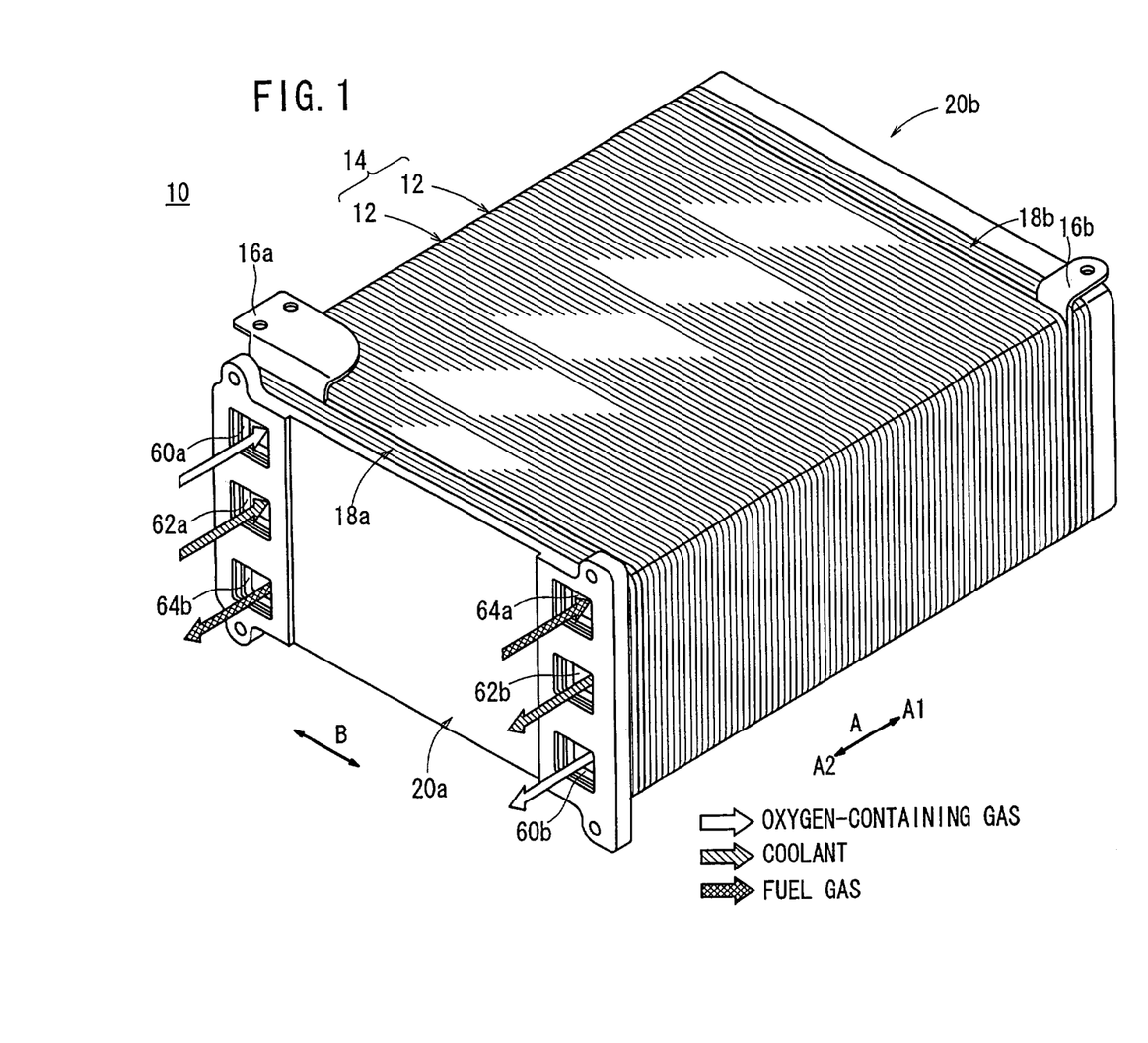
FIG. 1 is a perspective view schematically showing a fuel cell stack according to a first embodiment of the present invention.
Figure 2:
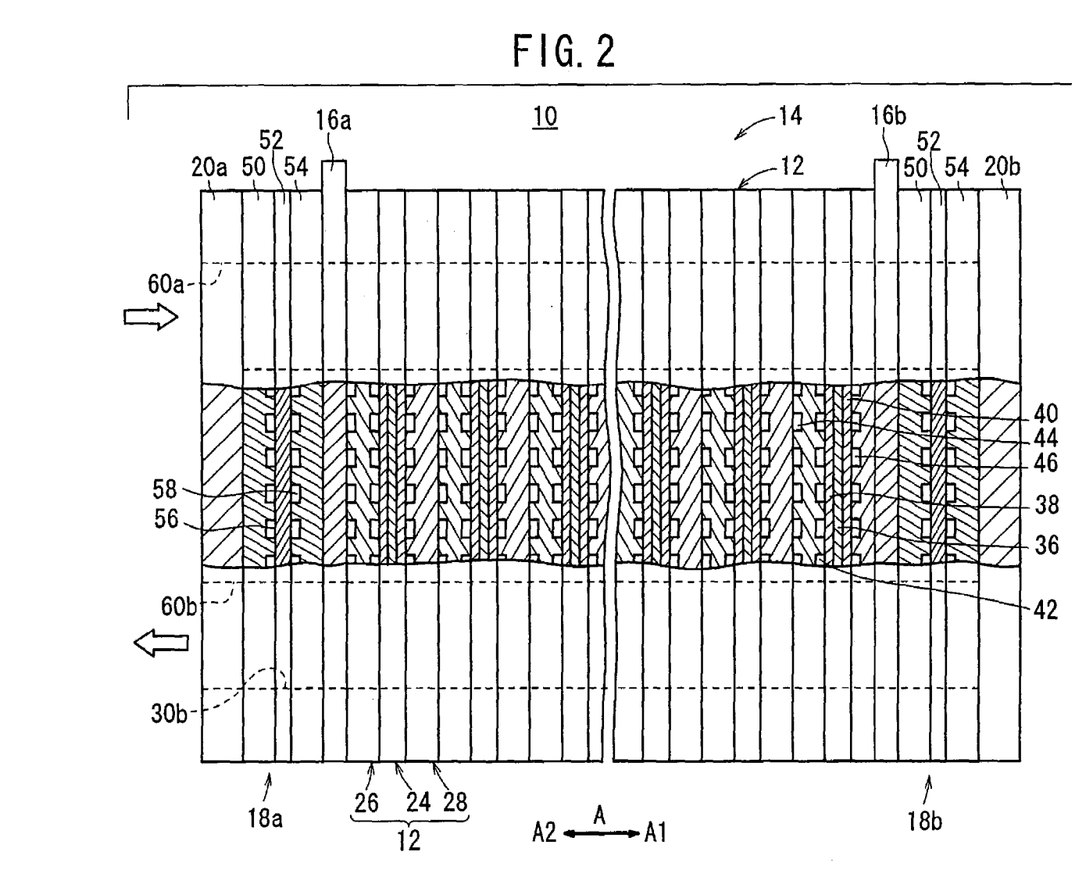
FIG. 2 is a cross sectional side view showing a part of the fuel cell stack.

FIG. 1 is a perspective view schematically showing a fuel cell stack 10 according to a first embodiment of the present invention. FIG. 2 is a cross sectional side view showing a part of the fuel cell stack 10.

The fuel cell stack 10 includes a stacked body 14 formed by stacking a plurality of fuel cells (unit cells) in a stacking direction indicated by an arrow A. A positive electrode terminal 16a and a negative electrode terminal 16b are connected to outermost unit cells disposed at opposite ends of the stacked body 14 in the stacking direction, respectively. Insulators 18a, 18b are stacked on the positive electrode terminal 16a and the negative electrode terminal 16b, respectively. Further, end plates 20a, 20b are stacked on the insulators 18a, 18b, respectively.

Figure 3:
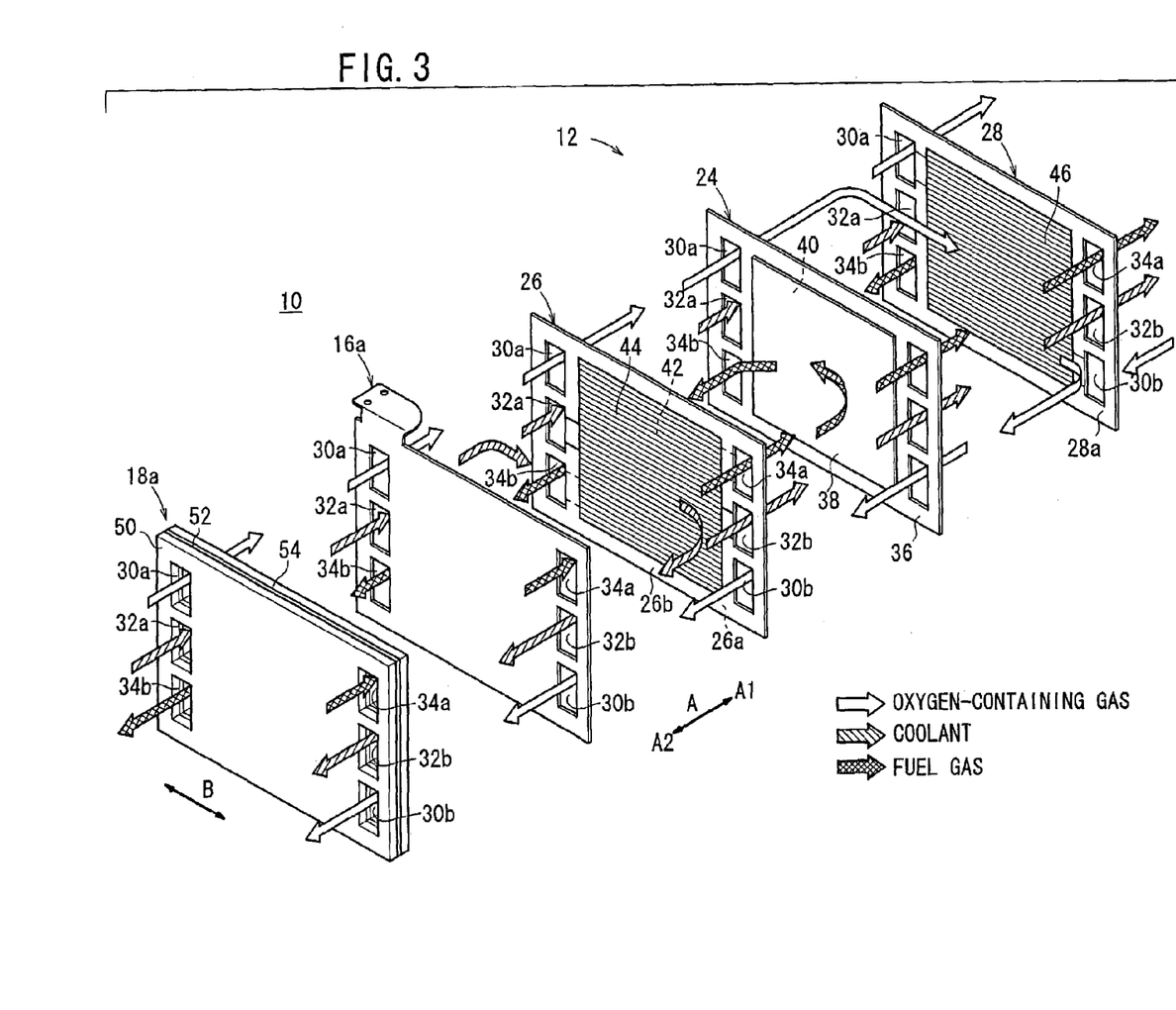
FIG. 3 is an exploded perspective view showing a unit cell of the fuel cell stack.

As shown in FIG. 3, each of the unit cells 12 includes a membrane electrode assembly (electrolyte electrode assembly) 24 and first and second separators 26, 28. The membrane electrode assembly 24 is interposed between the first and second separators 26, 28. Each of the first and second separators 26, 28 includes a metal plate, for example.

At an end of the unit cells 12 in the longitudinal direction indicated by an arrow B, an oxygen-containing gas supply passage (reactant gas supply passage) 30a for supplying an oxygen-containing gas, a coolant supply passage 32a for supplying a coolant, and a fuel gas discharge passage (reactant gas discharge passage) 34b for discharging a fuel gas such as a hydrogen-containing gas are formed. The oxygen-containing gas supply passage 30a, the coolant supply passage 32a, and the fuel gas discharge passage 34b extend in the direction indicated by the arrow A.

At the other end of the unit cells 12 in the longitudinal direction, a fuel gas supply passage (reactant gas supply passage) 34a for supplying the fuel gas, a coolant discharge passage 32b for discharging the coolant, and an oxygen-containing gas discharge passage (reactant gas discharge passage) 30b for discharging the oxygen-containing gas are formed. The fuel gas supply passage 34a, the coolant discharge passage 32b, and the oxygen-containing gas discharge passage 30b extend in the direction indicated by the arrow A.

The membrane electrode assembly 24 comprises an anode 38, a cathode 40, and an ion exchange membrane 36 of a solid electrolyte interposed between the anode 38 and the cathode 40. The ion exchange membrane 36 is formed by impregnating a thin membrane of perfluorosulfonic acid with water, for example.

Each of the anode 38 and cathode 40 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 38 and the electrode catalyst layer of the cathode 40 are fixed to both surfaces of the ion exchange membrane 36, respectively.

Figure 4:
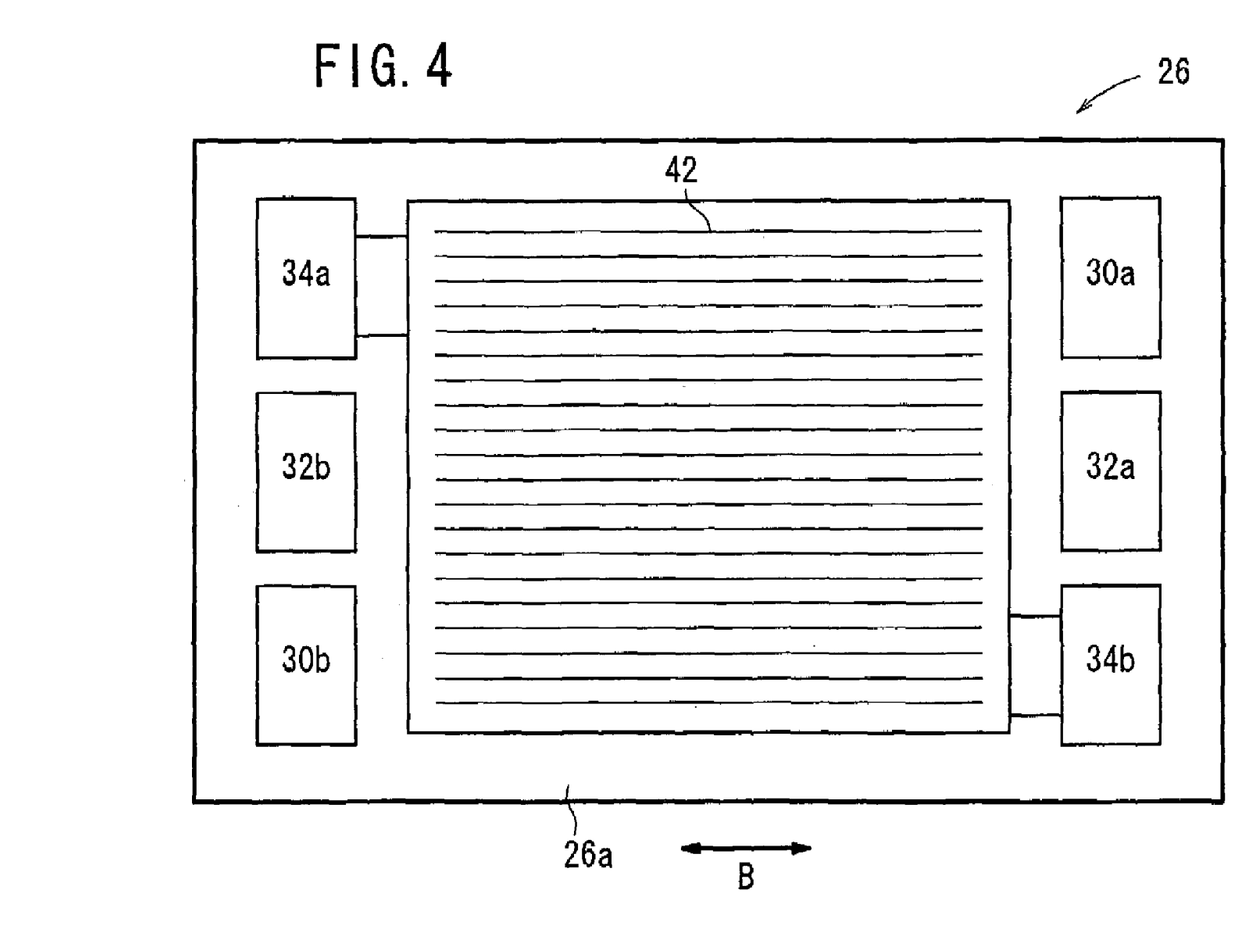
FIG. 4 is a front view showing a surface of a first separator of the unit cell.

As shown in FIGS. 3 and 4, the first separator 26 has a fuel gas flow passage 42 on its surface 26a facing the membrane electrode assembly 24. The fuel gas flow passage 42 is connected to the fuel gas supply passage 34a at one end, and connected to the fuel gas discharge passage 34b at the other end. The fuel gas flow passage 42 comprises a plurality of grooves extending in a direction indicated by the arrow B, for example. As shown in FIG. 3, the first separator 26 has a coolant flow passage 44 on the other surface 26b. The coolant flow passage 44 is connected to the coolant supply passage 32a at one end, and connected to the coolant discharge passage 32b at the other end. The coolant flow passage 44 comprises a plurality of grooves extending in the direction indicated by the arrow B.

The second separator 28 has an oxygen-containing gas flow passage 46 on its surface 28a facing the membrane electrode assembly 24. The oxygen-containing gas flow passage 46 is connected to the oxygen-containing gas supply passage 30a at one end, and connected to the oxygen-containing gas discharge passage 30b at the other end. The oxygen-containing gas flow passage 46 comprises a plurality of grooves extending in the direction indicated by the arrow B.

Figure 5:
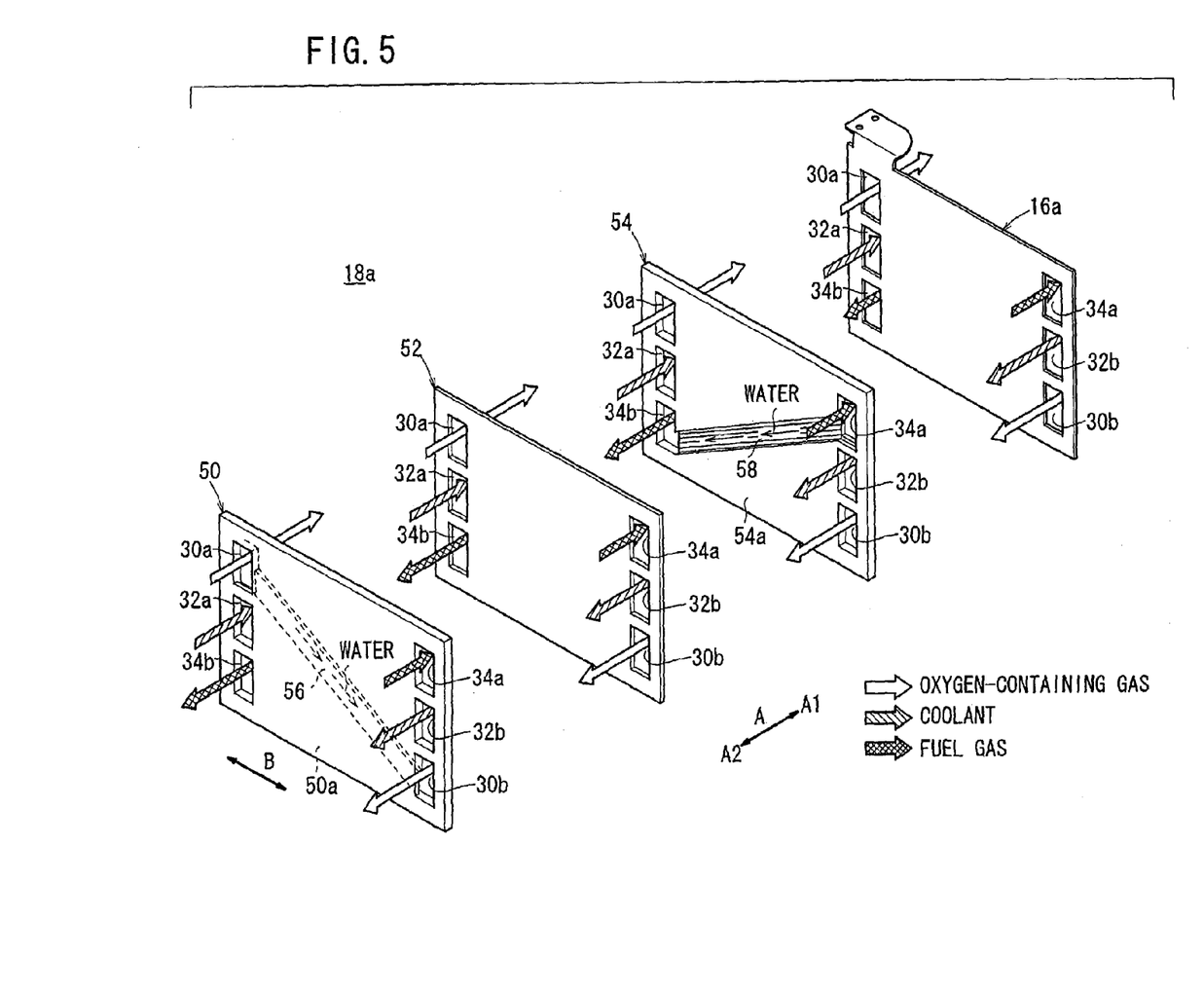
FIG. 5 is an exploded perspective view showing an insulator of the fuel cell stack.
Figure 6:
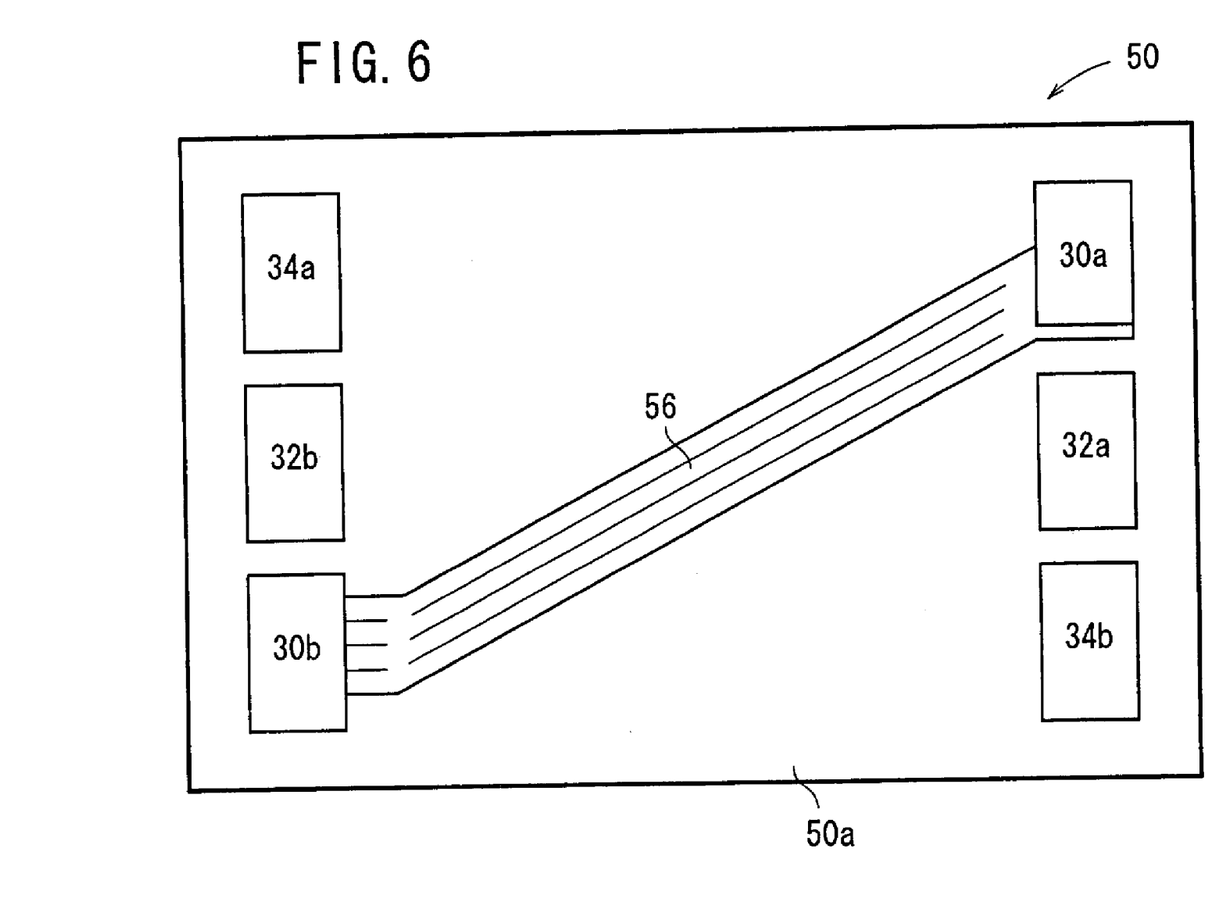
FIG. 6 is a front view showing a surface of a first insulator plate of the insulator.

As shown in FIG. 5, the insulator 18a provided outside the negative terminal plate 16a includes a first insulator plate 50, a second insulator plate 52, and a third insulator plate 54 stacked in the direction indicated by the arrow A. As shown in FIGS. 5 and 6, the first insulator plate 50 has a bypass passage 56 on its surface 50a facing the second insulator plate 52. The bypass passage 56 is connected to the oxygen-containing gas supply passage 30a at one end, and connected to the oxygen-containing gas discharge passage 30b at the other end.

As shown in FIG. 5, the third insulator plate 54 has a bypass passage 58 on its surface 54a facing the second insulator plate 52. The insulator 18b has the same structure as the insulator 18a. The bypass passage 58 is connected to the fuel gas supply passage 34a at one end, and connected to the fuel gas discharge passage 34b at the other end. The constituent elements of another insulator 18b that are identical to those of the insulator 18a are labeled with the same reference numeral, and description thereof is omitted.

As shown in FIG. 1, at an end of the end plate 20a in the longitudinal direction indicated by the arrow B, an oxygen-containing gas supply port 60a, a coolant supply port 62a, and a fuel gas discharge port 64b are formed. The oxygen-containing gas supply port 60a is connected to the oxygen-containing gas supply passage 30a. The coolant supply port 62a is connected to the coolant supply passage 32a. The fuel gas discharge port 64b is connected to the fuel gas discharge passage 34b. At the other end of the end plate 20a in the longitudinal direction, a fuel gas supply port 64a, a coolant discharge port 62b, and an oxygen-containing gas discharge port 60b are formed. The fuel gas supply port 64a is connected to the fuel gas supply passage 34a. The coolant discharge port 62b is connected to the coolant discharge passage 32b. The oxygen-containing gas discharge port 60b is connected to the oxygen-containing gas discharge passage 30b.

Next, operation of the fuel cell stack 10 according to the first embodiment will be described below.

In operating the fuel cell stack 10, a fuel gas such as a hydrogen-containing gas is supplied to the fuel gas supply port 64a of the end plate 20a, and an oxygen-containing gas is supplied to the oxygen-containing gas supply port 60a. Further, a coolant such as pure water, an ethylene glycol or an oil is supplied to the coolant supply port 62a. From the fuel gas supply port 64a, the oxygen-containing gas supply port 60a, and the coolant supply port 62a, the fuel gas, the oxygen-containing gas, and the coolant are supplied in series in the direction indicated by the arrow A1 to each of the unit cells 12 stacked together in the direction indicated by the arrow A to form the fuel cell stack 10.

As shown in FIG. 3, the oxygen-containing gas flows from the oxygen-containing gas supply passage 30a into the oxygen-containing gas flow passage 46 formed on the second separator 28, and flows along the cathode 40 of the membrane electrode assembly 24 to induce an electrochemical reaction at the cathode 40. The fuel gas flows from the fuel gas supply passage 34a into the fuel gas flow passage 42 formed on the first separator 26, and flows along the anode 38 of the membrane electrode assembly 24 to induce an electrochemical reaction at the anode 38.

In the membrane electrode assembly 24, the oxygen-containing gas supplied to the cathode 40, and the fuel gas supplied to the anode 38 are consumed in the electrochemical reactions at catalyst layers of the cathode 40 and the anode 38 for generating electricity.

After the fuel gas is consumed at the anode 38, the fuel gas flows into the fuel gas discharge passage 34b, and flows in the direction indicated by the arrow A2. Then, the fuel gas is discharged from the fuel gas discharge port 64b of the end plate 20a. Similarly, after the oxygen-containing gas is consumed at the cathode 40, the oxygen-containing gas flows into the oxygen-containing gas discharge passage 30b, and flows in the direction indicated by the arrow A2. Then, the oxygen-containing gas is discharged from the oxygen-containing gas discharge port 60b of the end plate 20a.

The coolant supplied to the coolant supply passage 62a flows from the coolant supply passage 32a into the coolant flow passage 44 formed on the first separator to flow in the direction indicated by the arrow B. After the coolant is used for cooling the membrane electrode assembly 24, the coolant flows through the coolant discharge passage 32 in the direction indicated by the arrow A2, and the coolant is discharged from the coolant discharge port 62b of the end plate 20a.

When the operation of the fuel cell stack 10 is started, or when the operation of the fuel cell stack 10 is restarted after a temporal interruption, the temperature of pipes (not shown) for supplying the oxygen-containing gas and the fuel gas to the fuel cell stack 10 is low. Therefore, water vapor may be condensed into liquid water in the pipes.

In an attempt to address the problem, in the first embodiment, the insulator 18a is provided near the oxygen-containing gas supply port 60a connected to the oxygen-containing gas supply passage 30a. The insulator 18a is interposed between the positive terminal plate 16a and the end plate 20a. When the oxygen-containing gas supplied to the oxygen-containing gas supply port 60a flows from the first insulator plate 50 to the second insulator plate 52, the condensed water flows into the bypass passage 56 formed on the surface 50a of the first insulator plate 50. The water flows out of the bypass passage 56 into the oxygen-containing gas discharge passage 30b, and is discharged from the oxygen-containing gas discharge port 60b of the end plate 20a.

The fuel gas supplied to the fuel gas supply port 64a of the end plate 20a flows through the fuel gas supply passage 34a from the first insulator plate 50 and the second insulator plate 52 to the third insulator plate 54. The water flows into the bypass passage 58 formed on the surface 54a of the third insulator plate 54. The water flows out of the bypass passage 58 into the fuel gas discharge passage 34b, and is discharged from the fuel gas discharge port 64b of the end plate 20a.

In the first embodiment, even if the condensed water flows into the fuel cell stack 10, it is possible to prevent the power generation surfaces (catalyst layers of the electrodes) from being covered with droplets of the condensed water in the stacked body 14. Therefore, the desirable power generation performance of the overall fuel cell stack 10 is maintained. Further, the fuel cell stack 10 can be produced simply by inserting the insulator 18a between the negative terminal plate 16a and the end plate 20a. With the simple and compact structure, it is possible to remove the excessive water.

In the fuel cell stack 10, the insulator 18b is inserted between the positive terminal plate 16b and the end plate 20b, Therefore, even if the water produced in the electrochemical reactions of the unit cell 12 is trapped at locations remote from the end plate 20b (near the end plate 20b), the water is effectively pushed out of the fuel cell stack 10. Thus, the water produced in the electrochemical reaction or the condensed water can be discharged from the fuel cell stack 10 smoothly.

Figure 7:
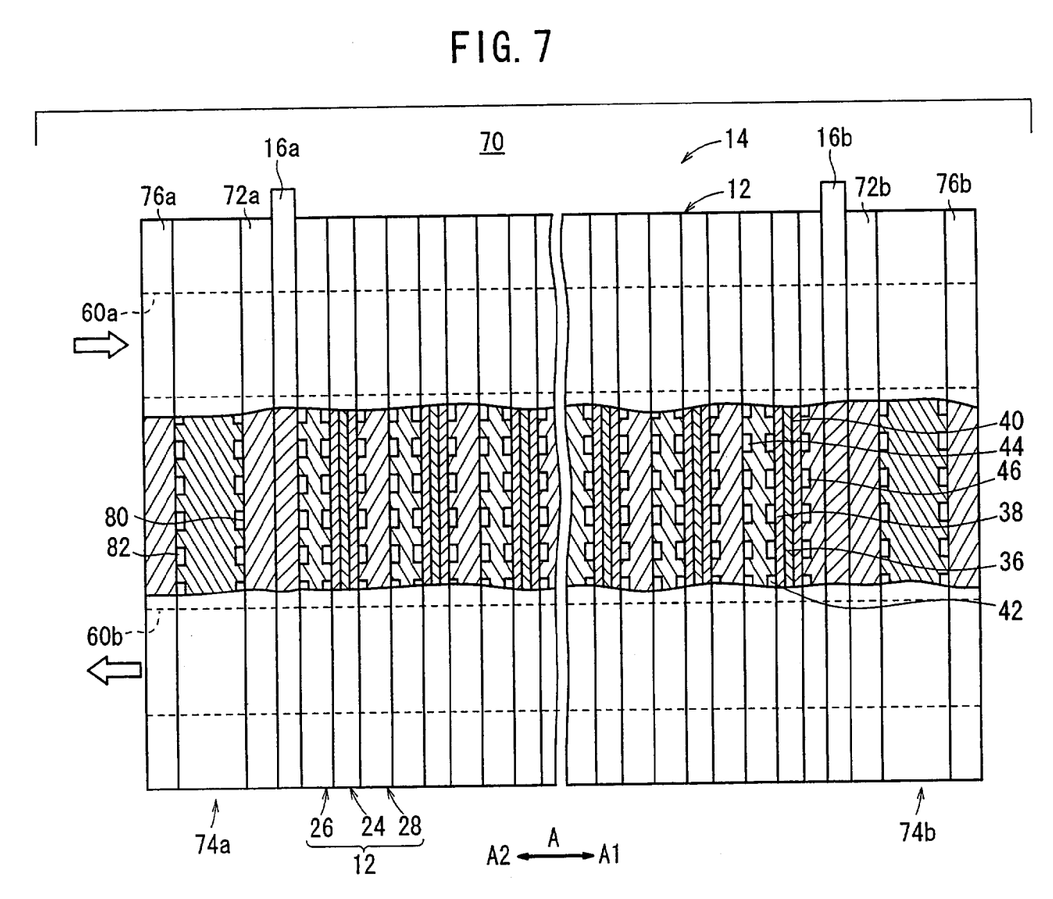
FIG. 7 is a cross sectional view showing a part of a fuel cell stack according to a second embodiment of the present invention.

FIG. 7 is a cross sectional view showing a part of a fuel cell stack 70 according to a second embodiment of the present invention. The constituent elements that are identical to those of the first embodiment are labeled with the same reference numeral, and description thereof is omitted. Further, in a third embodiment as described later, the constituent elements that are identical to those of the first embodiment are labeled with the same reference numeral, and description thereof is omitted.

In the fuel cell stack 70, insulator plates 72a, 72b are stacked on a negative electrode terminal 16a and a positive electrode terminal 16b, respectively. End plates 74a, 74b are stacked on the outside of the insulator plates 72a, 72b, respectively. Further, cover plates 76a, 76b are stacked on the outside of the end plates 74a, 74b, respectively.

Figure 8:
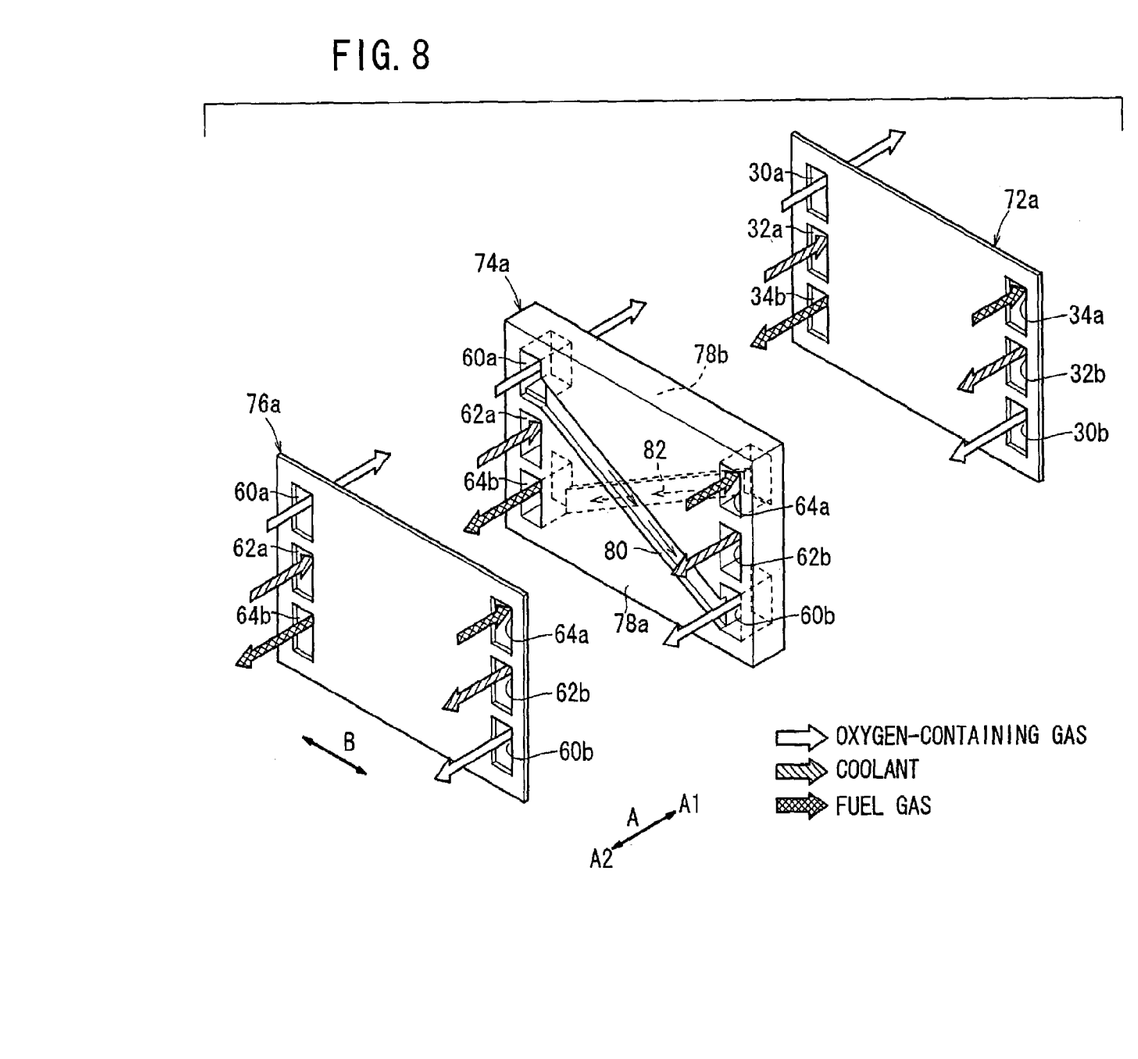
FIG. 8 is an exploded perspective view showing an end plate of the fuel cell stack according to the second embodiment.

As shown in FIG. 8, the end plate 74a has a bypass passage 80 on its surface 78a facing the cover plate 76a. The bypass passage 80 is connected to an oxygen-containing gas supply port 60a at one end, and connected to an oxygen-containing gas discharge port 60b at the other end. Further, the end plate 74a has a bypass passage 82 on its surface 78b facing the insulator plate 72a. The bypass passage 82 is connected to a fuel gas supply port 64a at one end, and connected to a fuel gas discharge port 64b at the other end. The end plate 74b has the same structure as the end plate 74a, and description thereof is omitted.

In the second embodiment, the end plates 74a, 74b of the fuel cell stack 70 has the bypass passage 80 for removing the water in the oxygen-containing gas, and the bypass passage 82 for removing the water in the fuel gas. Therefore, excessive water does not flow into the stacked body 14. With the simple and compact structure, the desirable power generation performance of the overall fuel cell stack 70 can be maintained as with the first embodiment.

Figure 9:
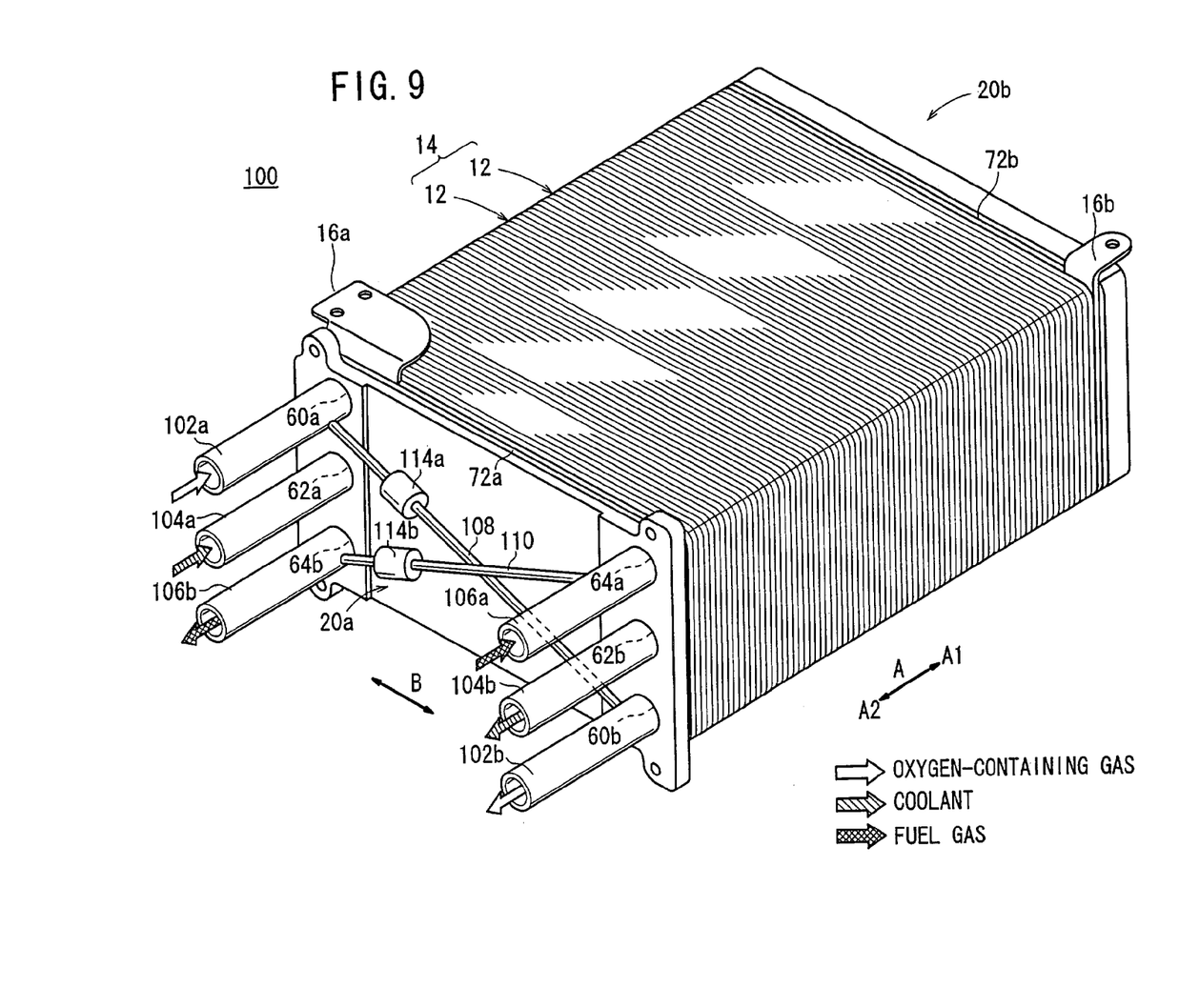
FIG. 9 is a perspective view schematically showing a fuel cell stack according to a third embodiment of the present invention.

FIG. 9 is a perspective view schematically showing a fuel cell stack 100 according to a third embodiment of the present invention.

An end plate 20a of the fuel cell stack 100 has an oxygen-containing gas supply port 60a, a coolant supply port 62a, and a fuel gas discharge port 64b. An oxygen-containing gas supply pipe (reactant gas supply pipe) 102a is connected to the oxygen-containing gas supply port 60a. A coolant supply pipe 104a is connected to the coolant supply port 62a. A fuel gas discharge pipe 106b is connected to the fuel gas discharge port 64b. Further, the end plate 20a has a fuel gas supply port 64a, a coolant discharge port 62b, and an oxygen-containing gas discharge ort 64b. A fuel gas supply pipe (reactant gas supply pipe) 106a is connected to the fuel gas supply port 64a. A coolant discharge pipe 104b is connected to coolant discharge port 62b. An oxygen-containing gas discharge pipe (reactant gas discharge pipe) 102b is connected to the oxygen-containing gas discharge port 60b.

A bypass pipe 108 is connected between the oxygen-containing gas supply pipe 102a and the oxygen-containing gas discharge pipe 102b. Similarly, a bypass pipe 110 is connected between the fuel gas supply pipe 106a and the fuel gas discharge pipe 106b.

Figure 10:
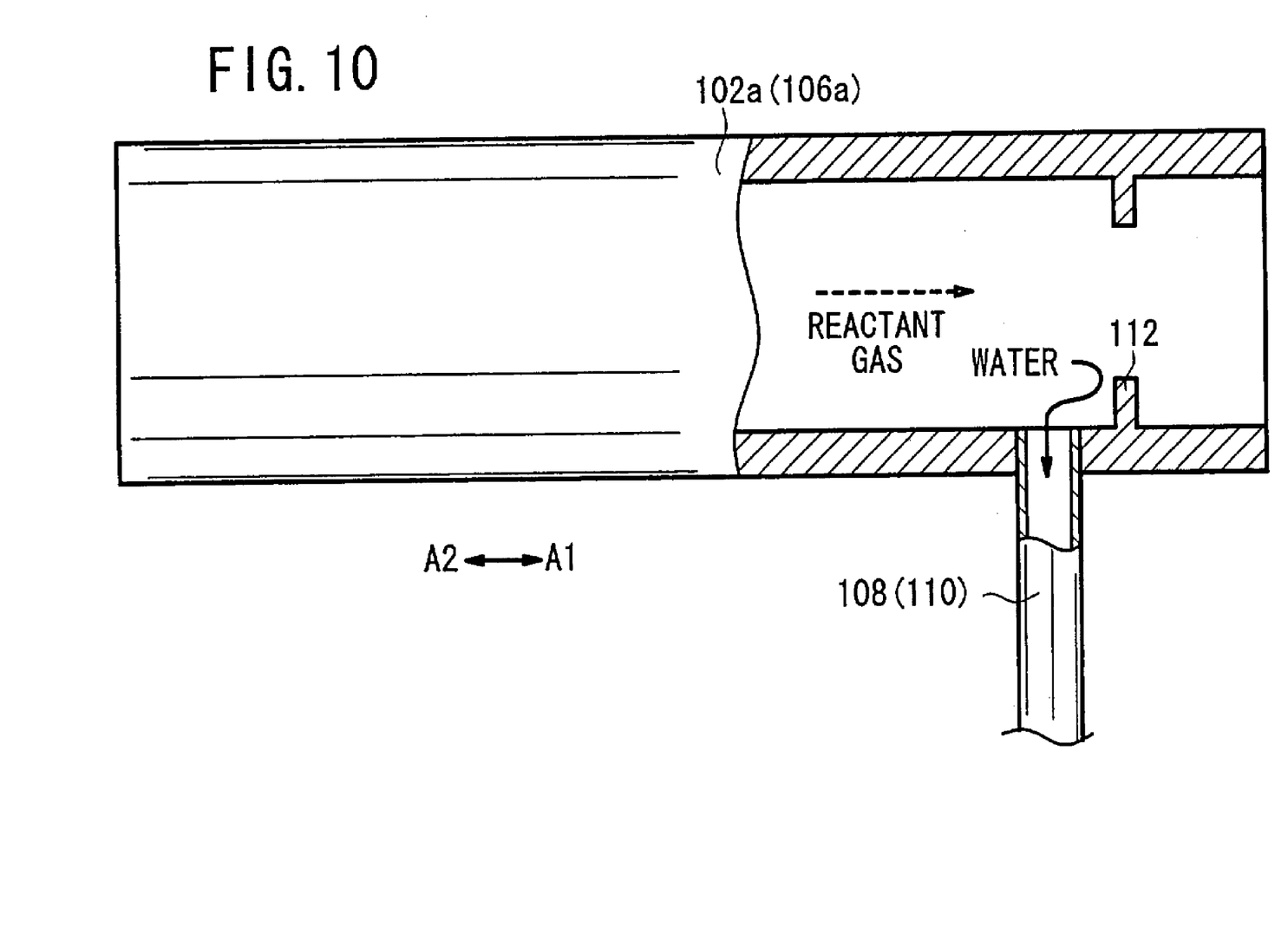
FIG. 10 is a cross sectional view of a reactant gas supply pipe of the fuel cell stack according to the third embodiment of the present invention.

As shown in FIG. 10, a ring-shaped wall plate 112 as a baffle plate is provided in each of the oxygen-containing gas supply pipe 102a and the fuel gas supply pipe 106a. The oxygen-containing gas flows through the oxygen-containing gas supply pipe 102a, and the fuel gas flows through the fuel gas supply pipe 106a in the direction indicated by the arrow A1. An end of the bypass pipe 108 is connected to the oxygen-containing gas supply pipe 102a at a position remote from the wall plate 112 for a certain distance backwardly in the direction indicated by the arrow A2. Similarly, an end of the bypass pipe 110 is connected to the fuel gas supply pipe 106b at a position remote from the wall plate 112 for a certain distance backwardly in the direction indicated by the arrow A2. The oxygen-containing gas discharge pipe 102b and the fuel gas discharge pipe 106b do not have any ring-shaped wall plate 112. A solenoid valve 114a, a solenoid valve 114b are provided for opening and closing the bypass pipe 108, the bypass pipe 110, respectively.

In the third embodiment, the solenoid valves 114a, 114b open the bypass pipes 108, 110 when the temperature of the fuel cell stack 100 is low, or the voltage applied to the fuel cell stack 100 is low, at the time of starting the operation. Thus, for example, when the oxygen-containing gas and the condensed water flow through the oxygen-containing gas supply pipe 102a in the direction indicated by the arrow Al, the water is removed by the wall plate 112 formed in the oxygen-containing gas supply pipe 102a. The water flows into the bypass pipe 108 connected at a lower end of the oxygen-containing gas supply pipe 102a. Then, the water flows through the bypass pipe 108, and is discharged from the bypass pipe 108 into the oxygen-containing gas discharge pipe 102b. In this manner, the oxygen-containing gas having a suitable moisture is supplied into the fuel cell stack 100.

In the third embodiment, the fuel cell stack 100 is produced simply by providing the oxygen-containing supply pipe 102a, the fuel gas supply pipe 106a, the bypass pipe 108 connected to the oxygen-containing gas supply pipe 102a, and the bypass pipe 110 connected to the fuel gas supply pipe 106a outside the end plate 20a. Therefore, the overall structure of the fuel cell stack 100 is simple. The bypass pipes 108, 110 provided outside the end plate 20a can be assembled easily, and the maintenance operation of the fuel cell stack 100 can be performed easily.

In a fuel cell stack according to the present invention, bypass passages for connecting reactant gas supply passages and reactant gas discharge passages are provided on insulators or end plates provided outside terminal plates. Before the reactant gases flow into a stacked body, the water in the reactant gases is removed to flow through the bypass passages, and discharged into the reactant gas discharge passages. With the simple and compact structure, it is possible to prevent the power generation surfaces of the electrodes from being covered with droplets of the water. Thus, the desirable power generation performance of the fuel cell stack can be maintained.

Further, in a fuel cell stack according to the present invention, reactant gas supply pipes for supplying reactant gases to reactant gas supply passages and reactant gas discharge pipes for discharging the reactant gases from the reactant gas discharge passages are provided outside end plates. The reactant gas supply pipes and the reactant gas discharge pipes are connected by bypass pipes. Before the reactant gases flow into the reactant gas supply passages, the water in the reactant gases is removed to flow through the bypass pipes, and is discharged from the bypass pipes into the reactant gas discharge passages. Therefore, excessive water does not flow into the fuel cell stack. With the simple and compact structure, the power generation performance of the fuel cell is greatly improved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising:
   a stacked body formed by stacking a plurality of electrolyte electrode assemblies and separators alternately in a stacking direction, said electrolyte electrode assemblies each including electrodes and an electrolyte interposed between said electrodes, terminal plates stacked on opposite ends of said stacked body;

insulators stacked outside said terminal plates;

end plates stacked outside said insulators;

wherein at least one reactant gas supply passage extends through said stacked body in said stacking direction for supplying a reactant gas to said electrolyte electrode assemblies, at least one reactant gas discharge passage extends through said stacked body for discharging said reactant gas from said electrolyte electrode assemblies, and at least one bypass passage is formed on said insulator or said end plate for connecting said reactant gas supply passage and said reactant gas discharge passage; and wherein the bypass passage is attached to the reactant gas supply passage at a position in the reactant gas supply passage that is upstream from the electrolyte electrode assemblies, and wherein the bypass passage is attached to the reactant gas discharge passage at a position in the reactant gas discharge passage that is downstream from the electrolyte electrode assemblies.

2. A fuel cell stack according to claim 1, wherein said insulator includes a first insulator plate and a second insulator plate stacked together; and said bypass passage is formed between said first insulator plate and said second insulator plate.

3. A fuel cell stack according to claim 2, further comprising a third insulator plate stacked on said second insulator plate, wherein said at least one reactant gas supply passage includes an oxygen-containing gas supply passage and a fuel gas supply passage;

said at least one reactant gas discharge passage includes an oxygen-gas discharge passage and a fuel gas discharge passage; and said at least one bypass passage includes a first bypass passage formed between said first insulator plate and said second insulator plate for connecting said oxygen-containing gas supply passage and said oxygen-containing gas discharge passage, and a second bypass passage formed between said second insulator plate and said third insulator plate for connecting said fuel gas supply passage and said fuel gas discharge passage.

4. A fuel cell stack according to claim 1, further comprising a cover plate stacked on said end plate, wherein said at least one bypass passage includes a first bypass passage formed between said end plate and said cover plate for connecting said reactant gas supply passage and said reactant gas discharge passage.

5. A fuel cell stack according to claim 4, wherein said at least one reactant gas supply passage includes an oxygen-containing gas supply passage and a fuel gas supply passage;

said at least one reactant gas discharge passage includes an oxygen-gas discharge passage and a fuel gas discharge passage;

said first bypass passage formed between said end plate and said cover plate connects said oxygen-containing gas supply passage and said oxygen-containing gas discharge passage; and said at least one bypass passage further includes a second bypass passage formed between said end plate and said insulator for connecting said fuel gas supply passage and said fuel gas discharge passage.

6. A fuel cell stack comprising:

a stacked body formed by stacking a plurality of electrolyte electrode assemblies and separators alternately in a stacking direction, said electrolyte electrode assemblies each including electrodes and an electrolyte interposed between said electrodes, terminal plates stacked on opposite ends of said stacked body;

insulators stacked outside said terminal plates;

end plates stacked outside said insulators;

wherein at least one reactant gas supply passage extends through said stacked body in said stacking direction for supplying a reactant gas to said electrolyte electrode assemblies, at least one reactant gas discharge passage extends through said stacked body for discharging said reactant gas from said electrolyte electrode assemblies, at least one reactant gas supply pipe and at least one reactant gas discharge pipe are provided outside said end plate for supplying said reactant gas from said reactant gas supply pipe to said reactant gas supply passage and discharging said reactant gas from said reactant gas discharge passage to said reactant gas discharge pipe, and said reactant gas supply pipe and said reactant gas discharge pipe are connected by a bypass pipe; and wherein the bypass pipe is attached to the reactant gas supply pipe at a position in the reactant gas supply pipe that is upstream from the electrolyte electrode assemblies, and wherein the bypass pipe is attached to the reactant gas discharge pipe at a position in the reactant gas discharge pipe that is downstream from the electrolyte electrode assemblies.

7. A fuel cell stack according to claim 6, wherein a baffle plate for stopping the flow of water is provided in said reactant gas supply pipe, at a position downstream, in a flowing direction of said reactant gas, from a region where said reactant gas supply pipe is connected to said bypass pipe.

8. A fuel cell stack according claim 6, wherein a valve is provided in said bypass pipe for opening and closing said bypass pipe.

9. A fuel cell stack comprising:

a stacked body formed by stacking a plurality of electrolyte electrode assemblies and separators alternately in a stacking direction, said electrolyte electrode assemblies each including electrodes and an electrolyte interposed between said electrodes, terminal plates stacked on opposite ends of said stacked body;

an insulator stacked outside one of the terminal plates, wherein the insulator comprises stacked first, second and third insulator plates;

end plates stacked outside said insulators;

an oxygen containing gas supply passage that extends through said stacked body, said terminal plates and said insulator in said stacking direction for supplying an oxygen containing gas to said electrolyte electrode assemblies;

an oxygen containing gas discharge passage that extends through said stacked body, said terminal plates and said insulator in said stacking direction for discharging said oxygen containing gas from said electrolyte electrode assemblies;

a first bypass passage formed between said first and second insulator plates, wherein the first bypass passage is connected to the oxygen containing gas supply passage at a position in the oxygen containing gas supply passage that is upstream from the electrolyte electrode assemblies and connected to the oxygen containing gas discharge passage at a position in the oxygen containing gas discharge passage that is downstream of the electrolyte electrode assemblies;

a fuel gas supply passage that extends through said stacked body, said terminal plates and said insulator in said stacking direction for supplying a fuel gas to said electrolyte electrode assemblies;

a fuel gas discharge passage that extends through said stacked body, said terminal plates and said insulator in said stacking direction for discharging a fuel gas from said electrolyte electrode assemblies; and a second bypass passage formed between said second and third insulator plates, wherein the second bypass passage is connected to the fuel gas supply passage at a position in the fuel gas supply passage that is upstream from the electrolyte electrode assemblies and connected to the fuel gas discharge passage at a position in the fuel gas discharge passage that is downstream of the electrolyte electrode assemblies.

* * * * *